United States Patent
Baber et al.

(10) Patent No.: US 7,159,005 B1
(45) Date of Patent: Jan. 2, 2007

(54) METHODS, SYSTEMS AND COMPUTER PROGRAM PRODUCTS FOR RESTARTABLE MULTIPLEXED FILE TRANSFERS

(75) Inventors: Stephen C. Baber, Raleigh, NC (US); Kathryn Heninger Britton, Chapel Hill, NC (US); John R. Hind, Raleigh, NC (US); Barron C. Housel, Chapel Hill, NC (US); Chandrasekaran Venkatapathy, Carrboro, NC (US); Michael C. Wanderski, Durham, NC (US); Ajamu Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 09/173,778

(22) Filed: Oct. 16, 1998

(51) Int. Cl.
*G06F 15/16* (2006.01)

(52) U.S. Cl. .................... 709/200; 709/203; 709/217
(58) Field of Classification Search ............... 709/203, 709/200, 202, 217; 710/29; 707/101, 1, 103 R, 707/205; 711/4, 173
See application file for complete search history.

(56) References Cited

U.S. PATENT DOCUMENTS

| | | | |
|---|---|---|---|
| 3,177,854 A | 4/1965 | Garcea | 123/184.38 |
| 4,554,898 A | 11/1985 | Yamada et al. | 123/188.3 |
| 4,930,072 A * | 5/1990 | Agrawal et al. | 707/101 |
| 5,121,479 A | 6/1992 | O'Brien | 395/250 |
| 5,261,089 A | 11/1993 | Coleman et al. | 395/600 |
| 5,269,017 A | 12/1993 | Hayden et al. | 395/575 |
| 5,276,876 A | 1/1994 | Coleman et al. | 395/650 |
| 5,319,773 A | 6/1994 | Britton et al. | 395/575 |

(Continued)

FOREIGN PATENT DOCUMENTS

| | | |
|---|---|---|
| CA | 1322607 | 1/1989 |
| JP | 61-41063 | 2/1986 |
| WO | WO 95/10805 | 4/1995 |
| WO | WO 97/46939 | 12/1997 |

OTHER PUBLICATIONS

*Application to Host File Transfer Restart Method, IBM Technical Disclosure Bulletin*, vol. 31, No. 5, pp. 409–410 (Oct. 1998).
*Synchronous Interleaved I/O File Server, IBM Technical Disclosure Bulletin*, vol. 32, No. 9B, pp. 91–92 (Feb. 1990).
*Client/Server–based File Transmission Checkpoint/Restart Protocol, IBM Technical Disclosure Bulletin*, vol. 38, No. 09, pp. 191–193 (Sep. 1995).

(Continued)

*Primary Examiner*—Frantz B. Jean
(74) *Attorney, Agent, or Firm*—Myers Bigel Sibley & Sajovec

(57) ABSTRACT

Methods, systems and computer program products are provided for concurrently transferring a plurality of files between a first data processing system and a second data processing system by multiplexing chunks of the plurality of files onto a connection between the first data processing system and the second data processing system and dynamically determining a chunk size for each multiplexed chunk. A "chunk" is an amount of data from a file to be transferred wherein the amount of data in the chunk is dynamically defined such that differing amounts of data are transferred in each chunk. Furthermore, the transfer of each multiplexed file is tracked so as to allow restarting of an interrupted file transfer from a point of interruption of the transfer.

41 Claims, 4 Drawing Sheets

U.S. PATENT DOCUMENTS

| | | | |
|---|---|---|---|
| 5,319,774 A | | 6/1994 | Ainsworth et al. .......... 395/575 |
| 5,371,886 A | | 12/1994 | Britton et al. ............... 395/600 |
| 5,428,771 A | | 6/1995 | Daniels et al. ............... 395/575 |
| 5,432,926 A | | 7/1995 | Citron et al. ................ 395/575 |
| 5,442,752 A | * | 8/1995 | Styczinski ..................... 711/4 |
| 5,446,904 A | | 8/1995 | Belt et al. ................... 395/750 |
| 5,469,503 A | | 11/1995 | Butensky et al. ........... 379/265 |
| 5,500,890 A | | 3/1996 | Rogge et al. .................. 379/91 |
| 5,546,582 A | | 8/1996 | Brockmeyer et al. ....... 395/650 |
| 5,551,032 A | | 8/1996 | Lyon et al. |
| 5,551,043 A | | 8/1996 | Crump et al. ............... 395/750 |
| 5,555,266 A | | 9/1996 | Buchholz et al. ........... 370/347 |
| 5,561,797 A | | 10/1996 | Gilles et al. ................ 395/600 |
| 5,613,060 A | | 3/1997 | Britton et al. .......... 395/182.13 |
| 5,751,719 A | | 5/1998 | Chen et al. .................. 370/473 |
| 5,758,174 A | | 5/1998 | Crump et al. ........... 395/750.05 |
| 5,765,004 A | | 6/1998 | Foster et al. ............ 395/750.05 |
| 5,768,538 A | | 6/1998 | Badovinatz et al. ... 395/200.78 |
| 5,802,267 A | | 9/1998 | Shirakihara et al. ... 395/182.13 |
| 5,916,307 A | | 6/1999 | Piskiel et al. ............... 709/300 |
| 5,961,605 A | | 10/1999 | Deng et al. .................. 709/234 |
| 6,006,289 A | * | 12/1999 | James et al. ................... 710/35 |
| 6,065,052 A | | 5/2000 | Van Loo ...................... 709/224 |
| 6,070,184 A | * | 5/2000 | Blount et al. ............... 709/200 |
| 6,078,564 A | | 6/2000 | Lakshman et al. .......... 370/235 |
| 6,098,126 A | * | 8/2000 | Batson et al. ................. 710/58 |
| 6,182,086 B1 | * | 1/2001 | Lomet et al. ................ 709/101 |
| 6,185,229 B1 | * | 2/2001 | Obikane et al. ............. 370/537 |
| 6,205,498 B1 | * | 3/2001 | Habusha et al. ............... 710/29 |
| 2003/0231346 A1 | * | 12/2003 | Tagawa ..................... 358/1.18 |
| 2004/0236924 A1 | * | 11/2004 | Johnson et al. ............. 711/173 |

OTHER PUBLICATIONS

*Combining Presumed Abort Two–Phase Commit Protocols with SNA's Last Agent Optimization, IBM Technical Disclosure Bulletin*, vol. 34, No. 7B, pp. 334–338 (Dec. 1991).

*Efficient Commit Protocol for Shared Nothing Architectures using Common Log Server, IBM Technical Disclosure Bulletin*, vol. 36, No. 12, pp. 65–66 (Dec. 1993).

*Two–Phase Commit Resynchronization, IBM Technical Disclosure Bulletin*, vol. 39, No. 01, pp. 79–80 (Jan. 1996).

IBM Patent Application Disclosure, "Method for File Transfer Restarts Using Standard Internet Protocol," IBM Docket No. AT9–97–044.

Loskiewicz–Buczak Anna et al., "Reliable File Transfer System Applicable in Unamiable Environment," in "IFIP WG 5.4/IFAC/EWICS Working Conference on Hardware and Software for Real Time Process Control –1988: Warsaw, Poland," edited by J. Zalewski and W. Ehrenberger, p. 573–574.

Poo, Gee–Swee et al., "File Recovery by ISO FTAM," *Computer Communications,* vol. 16, No. 12, Dec. 1993, p. 798–805.

Wang, Charles C. et al., "Performance Analysis of an Optimal File Transfer Protocol for Integrated Mobile Satellite Services," IEEE/IECE Global Telecommunications Conference (IEEE GLOBECOM) 1987, Tokyo, Japan, Nov. 15–18, 1987.

* cited by examiner

METHODS, SYSTEMS AND COMPUTER PROGRAM PRODUCTS FOR RESTARTABLE MULTIPLEXED FILE TRANSFERS

FIELD OF THE INVENTION

The present invention relates to file transfers and more particularly to file transfers well suited to the varying connection environments of mobile computing.

BACKGROUND OF THE INVENTION

In mobile applications, such as with personal data assistants (PDAs), smart telephones or laptop computers, often times off-line processing (or "intermittently connected operations") may be carried out so as to work without being continuously connected to a network or other processing system. One aspect of off-line processing involves the transfer of files from the mobile processing system to the network or other processing system.

Conventional off-line processing for file transfers typically would result in a queue of file transfers. The file transfers would be made in a serial fashion when a connection was established. Generally, before one file transfer could begin, the previous file transfer would end. Typically, if the connection was lost during the file transfer, the file transfer may have to be started all over. Thus, small files may have to wait for larger files to be transferred and higher priority files may also have to wait depending on when they were selected to be transferred. Furthermore, until the file transfer was completed, the file transferred may not be free to edit or otherwise modify.

A server system may need to transfer the same file to a plurality of client systems. Because individual clients may connect at different times for different lengths of time, the server system may be at different points of transferring the same file to different clients at any given point in time. Many conventional file transfer systems lock the file between the time the file transfer starts and the time that it is complete. Because there may be a substantial delay between the time an application on a server decides to transfer a file to one or more clients and the time that the last transfer is complete, locking the file on the server while the transfers occur can prevent the server from performing other useful functions with the file.

Conventional mobile systems also typically utilize the same transfer protocol and technique independent of the connection to the network. Thus, transfers which may be optimized for one connection type or protocol may be inefficient when utilized with other connection types or protocols.

Various systems have been developed in attempts to overcome limitations of data transfers. For example, U.S. Pat. No. 5,751,719 to Chen et al. entitled METHOD AND SYSTEM FOR DATA TRANSFER IN THE PRESENCE OF DISCONNECTS describes methods and systems for controlling data transfer operations during a communication between a transmitter and a receiver. Data packets which have been stored at the receiver remain stored there even after a disconnect to avoid the need for retransmitting the data packets. Data transmission is then resynchronized after the connection is reestablished. While such a system may reduce the impact of disconnects on file transfers, it may also fail to address the issue of sequential file transfer. Furthermore, such a system is not described as compensating for differing connection types and connection protocols.

Another example of a checkpoint system is provided in certain implementations of the Internet File Transfer Protocol (FTP). While these implementations allow checkpointing of individual file transfers, they typically do not provide checkpointing for multiple file transfers. Furthermore, these implementations typically transfer entire files sequentially on a first-in-first out fashion of the entire file. Accordingly, these implementations may not provide fairness or efficiently handle off-line file transfer requests such as may be common in mobile computing. FTP implementations also use multiple connections which may be impractical for many mobiles users, particularly those that use wireless networks.

Other checkpoint or restarting systems are described in U.S. Pat. Nos. 5,121,479, 5,269,017, 5,446,904, 5,551,043, 5,758,174, 5,765,004, and 5,802,267. Other checkpoint or restart systems are also described in IBM Technical Disclosures Vol. 38, No. 9, pp. 191–93 (1995) and Vol. 31, No. 5, pp. 409–410 (1988).

File servers and point-of-sale systems have also provided interleaved messages or files. See IBM Technical Disclosure Bulletin, Vol. 32, No. 9B, pp. 91–92 (1990). For example, U.S. Pat. No. 5,500,890 to Rogge et al. entitled POINT-OF-SALE SYSTEM USING MULTI-THREADED TRANSACTIONS AND INTERLEAVED FILE TRANSFER describes a dial-up asynchronous communication protocol which allows multiple point of sale terminals to multi-thread transactions to a host computer and to interleave mail messages and file transfers when credit card authorization requests from the terminal or responses to those authorization requests become available. Such a system, however, does not address the file availability issue of multiple transfers. Furthermore, the point of sale environment typically is homogeneous in the capabilities of the point of sale terminals and the protocols utilized.

Despite these previous efforts, a need still exists for improvements in file transfer, in particular in the mobile environment which may include varying connection types and protocols and differing devices utilized for such file transfers.

SUMMARY OF THE INVENTION

In view of the above discussion, it is an object of the present invention to provide for file transfer in differing communication environments.

Another object of the present invention is to provide for file transfers under conditions in which the communication environment changes in the middle of transferring a particular file.

A further object of the present invention is to provide file transfer suitable for use with devices of differing capabilities.

Still another object of the present invention is to provide file transfer which does not require sequential transfer of files.

Yet another object of the present invention is to allow multiple file transfers over a single connection.

A further object of the present invention is to allow users to modify a file after it has been selected for transfer.

Still another object of the present invention is to provide a file transfer mechanism which is tolerant of disconnect events.

These and other objects of the present invention are provided by concurrently transferring a plurality of files between a first data processing system and a second data processing system by multiplexing chunks of the plurality of files onto a connection between the first data processing system and the second data processing system and dynamically determining a chunk size for each multiplexed chunk. A "chunk" is an amount of data from a file to be transferred wherein the amount of data in the chunk may be dynamically defined such that differing amounts of data may be transferred in each chunk. Furthermore, the transfer of each multiplexed file may be tracked so as to allow restarting of an interrupted file transfer from a point of interruption of the transfer. In a particular embodiment, the transfers are tracked by storing in a persistent queue tracking information associated with each file transfer and storing a copy of each of the plurality of file in persistent storage.

In another embodiment of the present invention, the chunks are multiplexed onto the connection by selecting chunks of the plurality of files based on a fairness policy and multiplexing the selected chunks on the connection between the first data processing system and the second data processing system.

By multiplexing chunks of the plurality of files onto a connection between the two data processing systems, multiple files may be concurrently transferred. Furthermore, by tracking the transfer of each file, the multiple file transfers may be restarted, for example, if the connection is restarted. Because the tracking and file information may be stored in persistent storage, the file transfers may be interrupted and restarted even after power off sequences. Also, by selecting chunks to transfer based on a fairness policy, the concurrent transfer of multiple files may provide fairness between the files being transferred.

In an embodiment of the present invention, an object oriented system is provided that includes symbolic links to manage file transfers between a first data processing system (the "sending system") and a second data processing system (the "receiving system"). According to this embodiment, a symbolic link is a programming object that links a particular file to a particular file transfer operation to a particular partner data processing system. There may be a plurality of symbolic links for a particular file if it is in the process of being transferred to a plurality of partner data processing systems. A send symbolic link tracks the state of the file transfer on the sending system while a receive symbolic link tracks the state of the file transfer on the receiving system. A send symbolic link is originally created and populated with information describing the file transfer operation when an application uses the file transfer application programming interface to request the file transfer to a particular partner. A receive symbolic link is originally populated on the receiving system when the first chunk of the file transfer is processed. The data used by a symbolic link object is stored in a persistent queue. This allows the symbolic link to be repopulated from the persistent queue even after a disconnect event or after the system is turned off in the middle of the file transfer. A symbolic link object can dynamically modify the characteristics of a file transfer during the transfer of the file. A file transfer core object stores copies of the files to be transferred on the sending system and the partially transferred files on the receiving system. A connection reader object on the sending system repopulates a send symbolic link with data extracted from the persistent queue, and uses the symbolic link to determine how to construct and send the next chunk of a file to be transferred from the first data processing system to the second data processing system. A connection writer on the receiving system uses the received file chunk and the associated repopulated symbolic link to store the file chunk in the correct place within the file transfer core.

In particular, an object oriented system for transferring files between a first data processing system and a second data processing system utilizes a send symbolic link object which controls the transfer of chunks of files from the first data processing system to the second data processing system so as to dynamically modify characteristics of a file transfer during transfer of the file is provided. A persistent queue, responsive to the application program interface, stores data associated with a file transfer request for populating send symbolic link objects, e.g., "link data" such as the original location for a file, a final destination for a file, a temporary name for a file, a count of bytes transferred from the file, and the like. A file transfer core stores copies of files to be transferred and a connection reader extracts data associated with a file transfer request from the queue, repopulates a send symbolic link object with the extracted data and transfers a chunk of a file associated with a file transfer request specified by the repopulated send symbolic link object from the first data processing system to the second data processing system.

Such a system allows for disconnects by maintaining a persistent queue of data to populate the send symbolic link object and maintaining the file to transfer in the transfer core. If a disconnect occurs the transfer may be restarted using the symbolic link data in the persistent queue. The persistent queue and the send symbolic link object also allow for interleaving data by allowing chunks of files to be transferred rather than the entire file. These chunks may be transferred over a single connection as they may be multiplexed on the connection in the order that symbolic link data is extracted from the link queue.

Furthermore, by utilizing an object structure and a persistent queue where the transfer is controlled by the object, the transfer parameters may be varied for the connection, the connection protocol, the characteristics of the device or other parameters such as user preferences. These parameters may even be varied for different chunks of the same file. For example, a different chunk size may be used before and after a disconnection to adjust the file transfer for different link characteristics. Also, by copying the file to the file transfer core, the file may be freed up for further modification by the user.

In a further embodiment of the present invention, a repopulated send symbolic link object associated with a transfer request tracks the transfer of chunks from a file stored in the file transfer core associated with the transfer request, determines an amount of data in a chunk the connection reader is to transfer to the second data processing system and serializes data to repopulate the send symbolic link object in the queue. Furthermore, the data, associated with a file transfer to repopulate a send symbolic link object may be stored and extracted from the persistent queue based on a fairness policy. Thus, chunks from small files and large files may be multiplexed on a single connection in a manner which is fair to each file transfer.

In another embodiment of the present invention, where the file to be transferred is copied to the file transfer core, it may be determined if a file stored in the file transfer core is the same file as the file associated with the file transfer request. A copy of the file associated with the file transfer request may be stored in the file transfer core if the file associated with the file transfer request is different from the files stored in the file transfer core.

Furthermore, storage of the file associated with the file transfer request may also be controlled so as to modify file storage characteristics associated with the file when it is stored in the file transfer core. In such a system, the characteristics associated with the file may be controlled based on an operating environment of the first data processing system. The characteristics associated with the file may also be controlled based on a file type associated with the file.

In still another embodiment of the present invention, the file transfer system further includes a receive symbolic link object which controls the receipt of files from the first data processing system to the second data processing system. A connection writer receives chunks associated with a file transfer request from the first computer and populates a receive symbol link object with data associated with the received chunks. A persistent queue, responsive to the connection writer, stores data for populating receive symbolic link objects and a file transfer core, responsive to a populated receive symbolic link object, stores received data from files to be transferred.

In yet another embodiment of the present invention, the send symbolic link object includes a method for determining which data from the copy of the file stored in the file transfer core to include in a chunk to transfer to the second data processing system, and a method for tracking which data from the copy of the file stored in the file transfer core has been sent to the second data processing system.

A further embodiment of the present invention transfers files between a first data processing system and a second data processing system by receiving a file transfer request which requests transfer of a file from the first data processing system to the second data processing system, and which provides data for populating instances of a send symbolic link object. In response to receipt of the file transfer request, a send symbolic link object is generated and populated with data associated with the file transfer request. The populated send symbolic link object controls the transfer of chunks of files from the first data processing system to the second data processing system so as to dynamically modify characteristics of the file transfer during transfer of the file. A copy of the file associated with the transfer request is stored in a file transfer core. The data associated with the file transfer request for populating send symbolic link objects is stored in a persistent queue. Data associated with the file transfer request is extracted from the persistent queue to repopulate the send symbolic link object. The repopulated send symbolic link object determines a chunk of data from the file associated with the file transfer request to transfer to the second data processing system and the chunk of data from the file associated with the file transfer request determined by the repopulated send symbolic link object is transferred from the first data processing system to the second data processing system.

In another embodiment of the present invention, the repopulated send symbolic link object tracks the transfer of chunks from the file associated with a file transfer request and determines an amount of data in a chunk transferred to the second data processing system. Data to repopulate the send symbolic link object is stored in the persistent queue, where the stored data reflects the transfer of an amount of data from the file associated with the file transfer request corresponding to the amount of data in the chunk transferred to the second data processing system.

Furthermore, the data to repopulate the send symbolic link object associated with a file transfer may be stored and extracted from the queue based on a fairness policy. It may also be determined if a file stored in the file transfer core is the same file as the file associated with the file transfer request and store a copy of the file associated with the file transfer request in the file transfer core if the file associated with the file transfer request is different from the files stored in the file transfer core.

In still another embodiment of the present invention, chunks associated with a file transfer request are received from the first computer. Responsive to receiving chunks associated with a file transfer request, a receive symbolic link object is populated which controls the receipt of files from the first data processing system to the second data processing system. Data is stored in a persistent queue for repopulating receive symbolic link objects when subsequent chunks associated with the file transfer request are received. The chunk received from the first data processing system is then stored.

As will further be appreciated by those of skill in the art, the present invention may be embodied as methods, systems or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods, systems of computer program products. Accordingly, the present invention may take the form of an entirely hardware embodiment, an entirely software embodiment or an embodiment combining software and hardware aspects.

Figure 1:
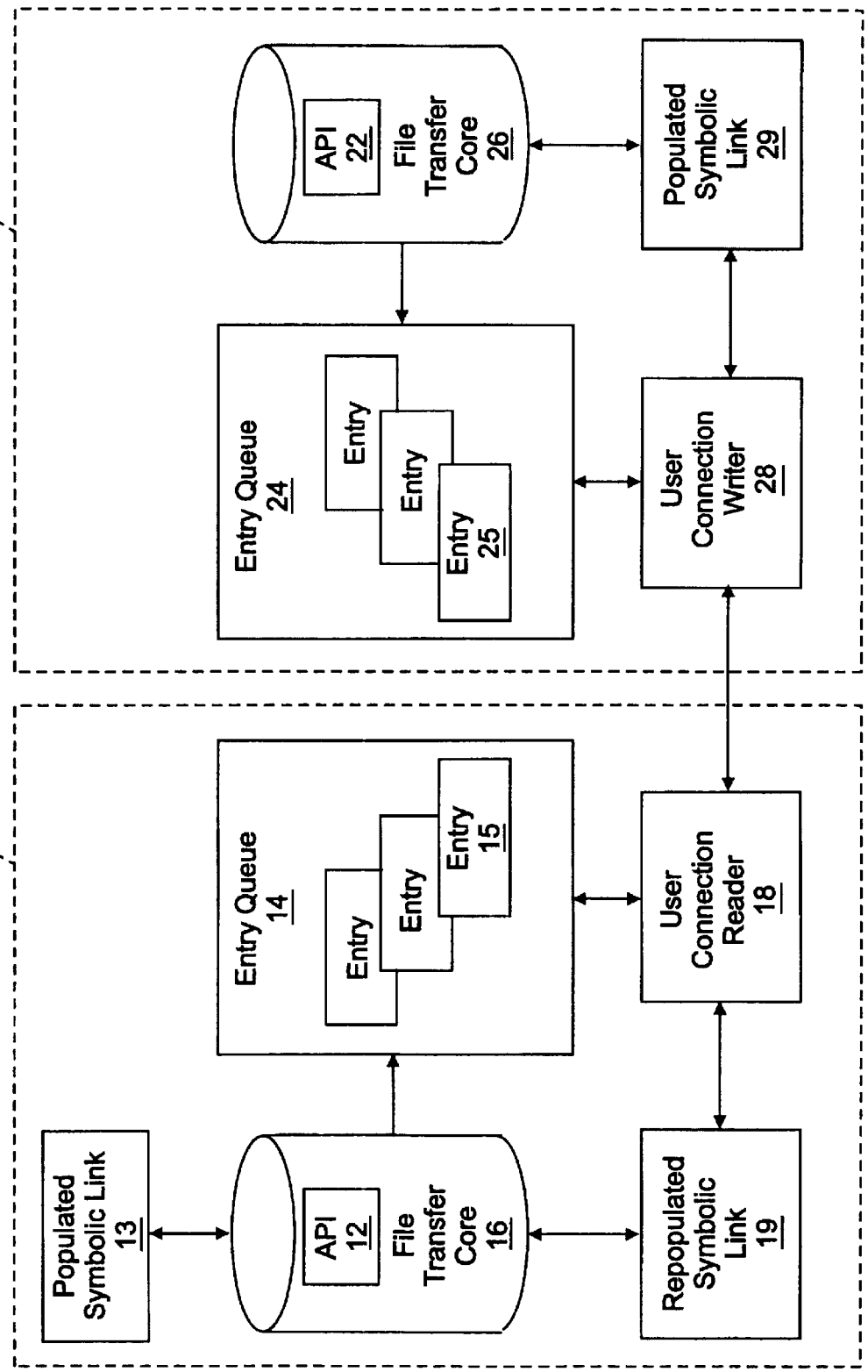
FIG. 1 is block diagram illustrating functions of a file transfer system according to the present invention.

One embodiment of the present invention is illustrated in FIG. 1. As seen in FIG. 1, a first data processing system 10, such as a personal data assistant (PDA), laptop computer, workstation or other data processing system, communicates with a second data processing system 20, such as a server, proxy server, workstation or other such data processing system. The file transfer system also includes an Application Program Interface (API) 12 which allows application programs executing on the first data processing system 10 to request file transfers. As illustrated in FIG. 1, the API 12 may be integrated with a File Transfer Core 16. The File Transfer Core 16 controls the storage and access of copies of files to be transferred from the first data processing system to the second data processing system. In response to a request to send a file, the File Transfer Core 16 generates and populates a Send Symbolic Link object 13 with data corresponding to the file transfer request. Such data may include "link data", e.g., the original location for the file, the final destination for the file, a temporary name for the file stored in the File Transfer Core 16 and a count of the bytes transferred from the file.

The File Transfer Core 16 also provides the data which populates the send symbolic link object 13 to a persistent Entry Queue 14. The persistent Entry Queue 14 stores an entry 15 for transmission to the second data processing system 20. An entry may be serialized symbolic link data for populating the send symbolic link object so as to create an instance of the send symbolic link object for each file transfer request. An entry 15 may also be data to be directly transferred to the second data processing system 20. As will be appreciated by those of skill in the art, other types of entries may also be utilized with the present invention. The persistent Entry Queue 14 maintains entries 15 such as symbolic link data between execution of instances of the file transfer system according to the present invention and more preferably between power cycles of the first data processing system 10 or the second data processing system 20. Furthermore, the persistent Entry Queue 14 should also maintain persistence even if the connection between the first data processing system 10 and the second data processing system is disconnected.

The persistent Entry Queue 14 preferably stores the entries in a manner which allows access to the entries 15 in a "fairness" order. This fairness order may be implemented as any policy, including a prioritization scheme or may simply be around-robin rotation between chunks of files. Alternatively, a rationing or a token policy could be utilized. Any number of fairness policies may be utilized while still benefitting from the teachings of the present invention and, therefore, the present invention should not be construed as limited to any particular fairness policy.

The send symbolic link object is preferably an object having methods which allow tracking of the file transfer. The send symbolic link object may have a method or methods which allow serialize and deserialize the symbolic link data for storage in the Entry Queue 14. Thus, the send symbolic link object also preferably includes methods for obtaining the original file name, the temporary file name, a destination file name, the processed byte count and which transfers the chunks of data to the User Connection Reader 18. The send symbolic link object also preferably includes a method for determining chunk size for file transfers to the second data processing system 20. The send symbolic link object may also determine the format or other characteristics for storing the file to be transferred.

The File Transfer Core 16 also preferably has methods which store the file to be transferred in the File Transfer Core 16. The files may be stored in a "storage bin" associated with the File Transfer Core 16. As described in more detail below, the storage bin may be managed as a cache such that files which have no current references in the Entry Queue 14 are removed from the storage bin if not referenced within a time period (e.g. 30 minutes). Thus, a cache of handles to the files in the storage bin may be used to manage the files stored in the storage bin in much the same manner as a conventional instruction cache would manage data provided to a processor. Accordingly, as will be appreciated by those of skill in the art, any suitable caching technique may be utilized to manage the storage bin. However, if references to a file are utilized to manage the storage bin, the File Transfer Core 16 also preferably maintains information on the references to a file stored by the File Transfer Core 16. Thus, the file transfer core may keep a reference count which indicates the number of entries in the persistent Entry Queue 14 which reference a particular file.

Furthermore, the File Transfer Core 16 may also process the files before storage. For example, if the present file transfer system is utilized in a PDA, the file may be compressed before storing so that the compressed file utilizes less storage when stored for transfer to the second data processing system 20. Similarly, the File Transfer Core 16 may have a configurable capacity limit and a high water mark (e.g. 50% of the limit) for a storage bin of the File Transfer Core 16. When the high water mark is reached, new copies of files stored in the File Transfer Core 16 storage bin could be compressed before storing to reduce the amount of memory or disk space required to store the file in the File Transfer Core 16.

The File Transfer Core 16 is a persistent store for files to transfer to the second data processing system 20. Accordingly, the File Transfer Core 16 maintains a copy of the files to transfer between execution of instances of the file transfer system according to the present invention and more preferably between power cycles of the first data processing system 10 or the second data processing system 20. Furthermore, the File Transfer Core 16 should also maintain persistence even if the connection between the first data processing system 10 and the second data processing system is disconnected.

Symbolic link data of an entry 15 is provided by the persistent Entry Queue 14 in the order it was received to the User Connection Reader 18 which repopulates the send symbolic link object to provide the repopulated send symbolic link object 19. In other words, a serialized stream repopulates the symbolic link object when taken off the Entry Queue 14. The repopulated send symbolic link 19 then is used to interact with the File Transfer Core 16.

The repopulated send symbolic link object 19 determines the characteristics of the file transfer for the file associated with the symbolic link data 15 extracted from the persistent Entry Queue 14 and provides a chunk of data from the file stored in the File Transfer Core 16 to the User Connection Reader 18 for transfer to the second data processing system 20. A chunk of a file is an amount of data from the file to transfer and may vary from transfer to transfer and/or file to file. Accordingly, the send symbolic link object preferably includes a method for determining the chunk size for a transfer. Such a method may determine chunk size based on the type of file, the type of connection, user preferences or other transfer specific bases. For example, if the connection between the first data processing system 10 and the second data processing system 20 is Transfer Control Protocol/Internet Protocol (TCP/IP) then the chunk size may be determined as multiples of the TCP/IP data packet size so as to minimize the number of packets to send a chunk. Similarly, if connection quality is bad then smaller chunks may be sent to reduce the amount of data which may need to be retransmitted if the connection is lost. If a priority associated with a file transfer is high, then the chunk size may be increased to more quickly transfer the file to the second data processing system 20.

In particular, the send symbolic link object may factor network responsiveness and device resource limitations in determining chunk size. For example, the File Transfer Core 16 load may be utilized in determining dynamic chunk size. Also, a slow network or bogged down system due to resource constraints may be the leading factors in a "lag" in a file transfer system. Averages may also be used to account for users requesting file transfers at differing times and rates. In a particular example, chunk size may be determined as:

$$\text{current chunk size} = c * \text{Max}\left(a, \text{Min}\left(\frac{d*f}{g*e}, b\right)\right)$$

where a is a minimum chunk size alteration factor (e.g. 1), b is a maximum chunk size factor (e.g. 10), c is a configurable parameter defining the average chunk size, d is the number of currently connected users, e is the number of outstanding file transfer sends, f is the average number of concurrent file transfer sends, and g is the average number of concurrent users.

The send symbolic link object also preferably includes a method for tracking the amount of data transferred to the second computer for a file. Thus, when a send symbolic link object is repopulated, the send symbolic link object may provide the next chunk of the file to the User Connection Reader 18 for transfer to the second data processing system 20.

The specific implementations of the methods described herein with respect to a send symbolic link object and the File Transfer Core 16 may be readily apparent to those of skill in the art in light of the present disclosure and, therefore, will not be described in detail herein. Furthermore, other methods in the send symbolic link object may be utilized while still benefitting from the teachings of the present invention. Accordingly, the present invention should not be construed as limited to a particular set of methods or data for population associated with the send symbolic link object but may include other methods or data as will be appreciated by those of skill in the art in light of the present disclosure.

The receive portion of the file transfer system according to the present invention receives data from the first data processing system 10 at the User Connection Writer 28. The User Connection Writer 28 has access to the persistent Entry Queue 24 associated with the second data processing system 20 and can extract from the persistent Entry Queue 24, entries 25, such as symbolic link data, associated with the received chunk from the file being transferred from the first data processing system 10. The user connection writer 28 populates a receive symbolic link object with the extracted symbolic link data 25 to provide a populated receive symbolic link object 29. If symbolic link data is not present in the persistent Entry Queue 24, then an instance of the receive symbolic link object is populated by the File Transfer Core 26. Data which may be used to populate the receive symbolic link object may include, for example, the original file name, the final destination a temporary file name and the count of bytes transferred.

The receive symbolic link object may have a method or methods which serialize and deserialize the symbolic link data for storage in the Entry Queue 24. Thus, the receive symbolic link object also preferably includes methods for obtaining the original file name, the temporary file name, a destination file name and the processed byte count.

The File Transfer Core 26 preferably includes a method to store the received data in the File Transfer Core 26 associated with the second data processing system 20. Furthermore, the File Transfer Core 26 may also processes the files before storage. For example, the File Transfer Core may include a method to compress or decompress files being stored as described above.

The File Transfer Core 24 may also include the reference count and cache managing of the storage bin of the File Transfer Core 24 as described above with respect to the File Transfer Core 14 of the first data processing system.

The persistent entry queue 24 and the File Transfer Core 26 are preferably persistent as described above with respect to the persistent Entry Queue 14 and File Transfer Core 16 associated with the first data processing system 10. The second data processing system 20 also includes an API 22, which may be incorporated in the File Transfer Core 26, for notifying applications that a file transfer is in progress or complete. Thus, when the File Transfer Core 26 has received all of a file, the API 22 may notify an application of the completion of the transfer.

The specific implementations of the methods described herein with respect to the receive symbolic link object and the File Transfer Core 26 may be readily apparent to those of skill in the art in light of the present disclosure and, therefore, will not be described in detail herein. Furthermore, other methods in the receive symbolic link object may be utilized while still benefitting from the teachings of the present invention. Accordingly, the present invention should not be construed as limited to a particular set of methods or data for population associated with the receive symbolic link object but may include other methods or data as will be appreciated by those of skill in the art in light of the present disclosure.

The present invention will now be described with respect to FIG. 2 through FIG. 4 which are flowcharts illustrating the operation of a file transfer system according to the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
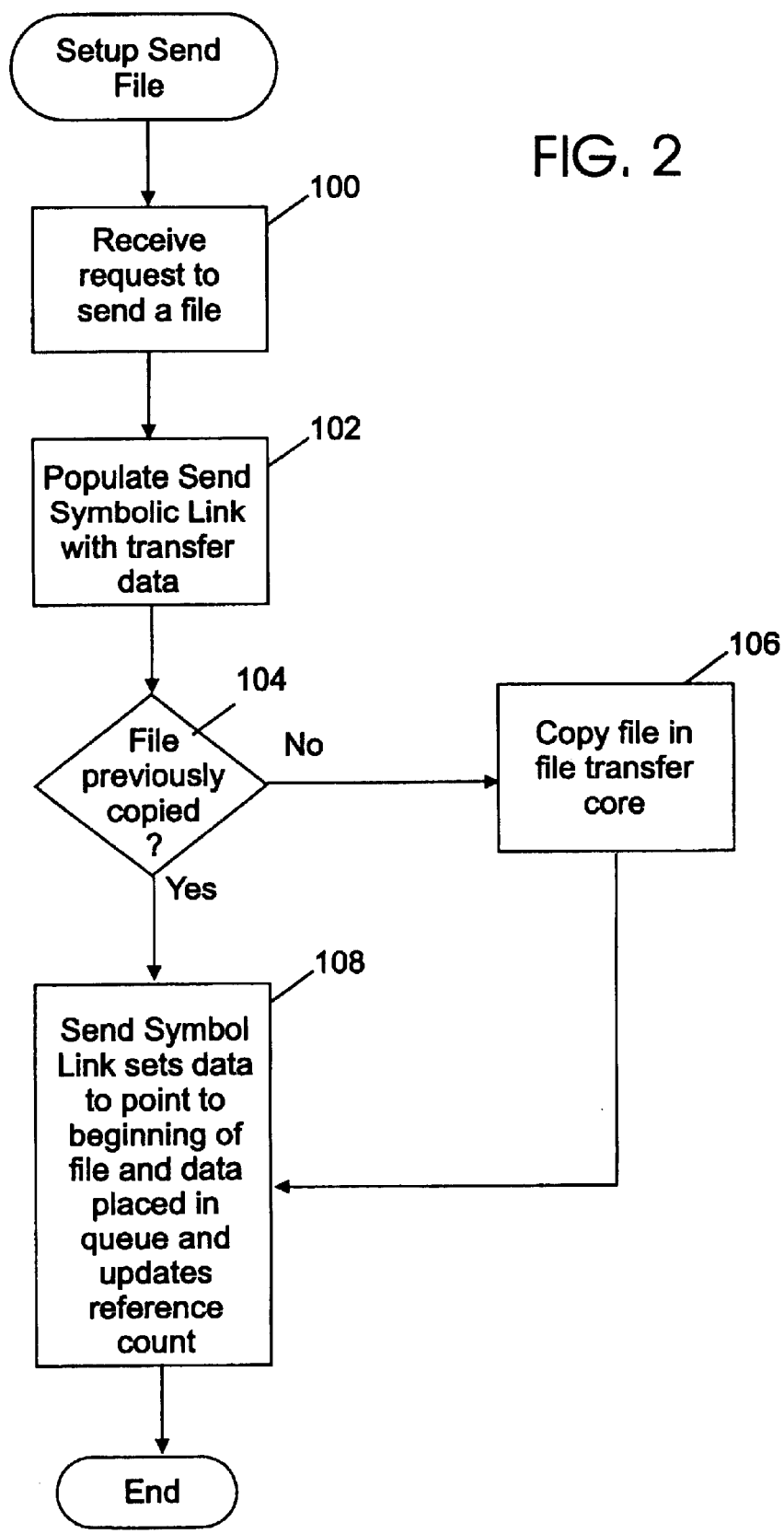
FIG. 2 is a flow chart illustrating operations performed on receipt of a file transfer request according to the present invention.

FIG. 2 illustrates operations of the present invention when a request is received by the API 12 to send a file to the second data processing system 20. A request is received by the API 12 (block 100) of the File Transfer Core 16 which populates the send symbolic link object with data associated with the request to provide the populated send symbolic link object 13 (block 102). Such a population of the send symbolic link object may include data as described above.

After populating the send symbolic link object with data, the File Transfer Core 16 determines if the file associated with the file transfer request is already stored in the File Transfer Core 16 (block 104). Such a determination may be made by comparing a CRC for the file to transfer to CRC's for the files stored by the File Transfer Core 16. If the file has not been stored in the file transfer core 16, then the populated send symbolic link object saves a copy of the file in the file transfer core 16. As described above, the File Transfer Core 16 may also perform other operations, such as compression of the copy of the file prior to storing the copy of the file in the File Transfer Core 16.

If the file has been previously stored, then the populated send symbolic link object 13 sets its transfer start pointer, which points to the location in the file to send data from, to the beginning of the file and the data which populates the populated send symbolic link object is serialized and stored in the persistent link queue 14 to provide symbolic link data 15 and updates a reference count (block 108).

Figure 3:
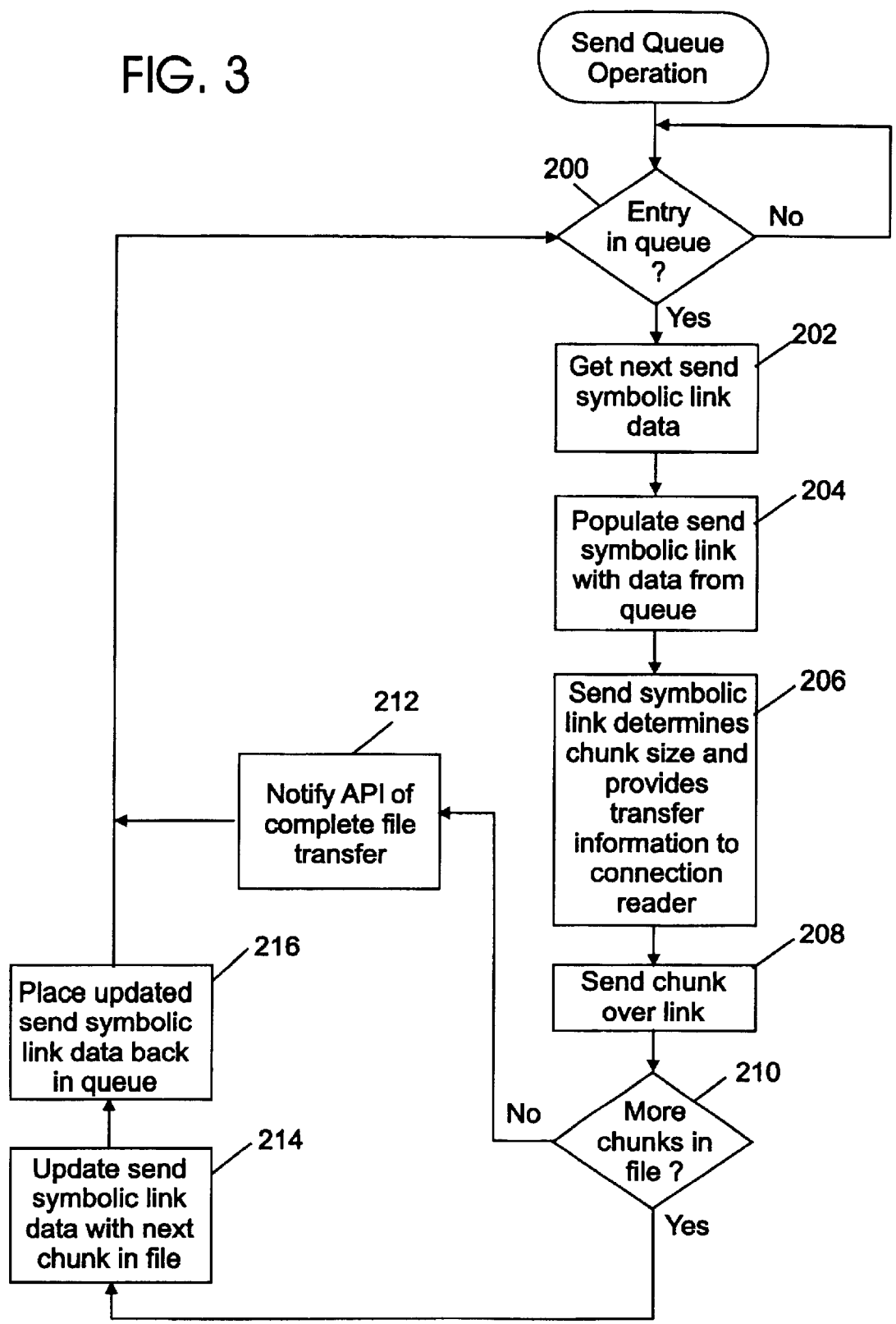
FIG. 3 is a flow chart illustrating send operations of the present invention.

FIG. 3 illustrates operations which are performed in sending chunks of a file while symbolic link data 15 remains in the persistent Entry Queue 14. As seen in FIG. 3, if there are no entries in the Entry Queue 14, the User Connection Reader 18 waits until data is in the persistent link queue 14 (block 200). When an entry is in the persistent Entry Queue 14, the User Connection Reader 18 extracts the entry 15 from the persistent Entry Queue 14 (block 202) and if symbolic link data repopulates a send symbolic link object with the extracted symbolic link data 15 to provide a repopulated symbolic link object 19 (block 204). The repopulated send symbolic link object 19 then determines the size of the chunk of the file to transfer and provides the chunk to transfer to the User Connection Reader 18 by providing the chunk size and starting location in the file for the chunk of the File Transfer Core 16, obtaining the chunk and providing it to the User Connection Reader 18 (block 206).

As described above, the determination of the chunk size may be based on a number of parameters including, for example, the connection type, the connection protocol, a priority associated with the file to transfer, or other parameters associated with the file transfer. Furthermore, as described above, the size of the chunk transferred may change from transfer to transfer for a file. Such a change in chunk size may, for example, be based on the number of file transfers in the persistent link queue 14 such that larger chunks are sent when few file transfers are queued and smaller chunks are sent when numerous file transfers are queued.

The User Connection Reader 18 then sends the chunk of data specified by the repopulated send symbolic link object 19 to the second data processing system 20 (block 208). If the chunk sent was the last chunk in the file (block 210), then the API 12 is notified of the completed file transfer (block 212) the instance of the repopulated symbolic link object 19 is terminated and the symbolic link data is not returned to the persistent Entry Queue 14.

However, if more chunks are present in the file to transfer, then the start location of the transfer start pointer in the repopulated symbolic link object 19 is updated to reflect the new starting location (block 214), the instance of the repopulated symbolic link object 19 is terminated and the updated symbolic link data is serialized and returned to the persistent queue (block 216).

Figure 4:
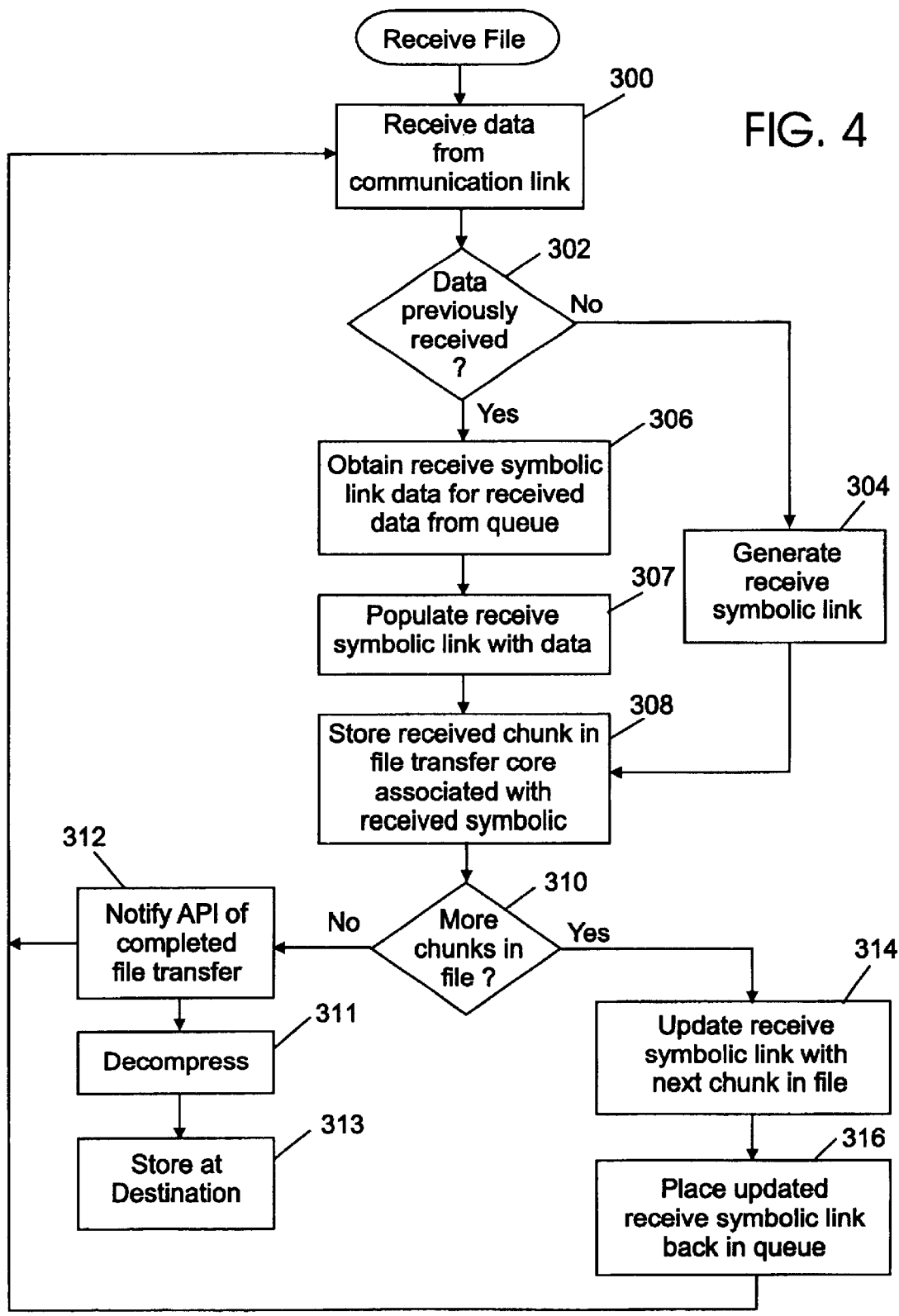
FIG. 4 is a flow chart illustrating receive operations according to the present invention.

FIG. 4 illustrates the operations of the second data processing system 20 when a chunk of a file is received. A chunk of a file is received by the User Communication Writer 28 (block 300) and it is determined if the received chunk is the first chunk received for a file (block 302). If it is the first chunk of a file then the data to populate a receive symbolic link object is generated as described above (block 304). If the received chunk is not the first chunk received for a file, then the User Connection Writer 28 extracts from the persistent Entry Queue 24 the symbolic link data 25 for the file associated with the received chunk (block 306). The association of chunks with files and symbolic link data may be made in any number of ways known to those of skill in the art. For example, a header may be attached to a chunk which would includes an item ID, the amount of data in the chunk and the amount of data in the file. Also, When both send and receive transfers are begun a CRC check may be made to verify hits in the File Transfer Core 16 and 18. Thus, the file transfer protocol may also relay CRC information in its header. Such information could then be used by the second data processing system 20 to further control the transfer of data from the first data processing system 10.

Whether the chunk is from a new or existing transfer, a receive symbolic link object is then populated with the symbolic link data to provide a populated receive symbolic link object 29 (block 307). The populated receive symbolic link object 29 the controls the storing of the received chunk in the File Transfer Core 26 (block 308). As described above, methods other than just providing information for storing the received chunk may also be carried out by the populated receive symbolic link object 29.

After storing the chunk, it is determined if the file associated with the received chunk includes more chunks (block 310). If the chunk received was the last chunk in the file (block 310), then the API 22 is notified of the completed file transfer (block 312), and the transferred file is decompressed (if necessary) (block 311) and stored at the appropriate destination (block 313). The instance of the populated receive symbolic link object 29 is terminated and the symbolic link data is not returned to the persistent Entry Queue 24.

However, if more chunks are present in the file, then the start location of the transfer start pointer in the populated receive symbolic link object 29 is updated to reflect the new starting location (block 314), the instance of the populated receive symbolic link object 29 is terminated and the updated symbolic link data is serialized and returned to the persistent Entry Queue 24 (block 316).

Thus, multiple files may be concurrently transferred in a multiplexed manner as each file transfers one chunk of data as determined by the send symbolic link object and then is returned to the persistent link queue 14 to be extracted based on a fairness policy. Furthermore, because the Entry Queues 14 and 24 and the File Transfer Cores 16 and 26 are persistent and track the starting location for the next transfer, a file transfer may be interrupted at any point and then restarted from the point it left off. Such an interruption may result from user intervention or outside intervention, such as loss of the connection between the first data processing system 10 and the second data processing system 20. As will be appreciated by those of skill in the art, user interruption may be readily incorporated into the system described herein. Preferably, if such user intervention terminates a chunk transfer in progress, then both data processing systems discard any partially received data and retransmit the interrupted chunk when data transfer is restarted.

While the present invention has been described with respect to file transfers, in an alternative embodiment, data transfers (i.e. transfers of a single chunk of data) may also be multiplexed with file transfers. In such a case, the chunk of data my be directly stored in the Entry Queue 14 by wrapping the data as an entry 15 and the data transferred to the second data processing system 20 by the user connection reader 18 without requiring population of a send symbolic link object. Thus, data may be multiplexed with files for transfer in the same fairness sequence as file transfers.

Furthermore, as will be appreciated by those of skill in the art, clean up of the file transfer cores 16 and may be accomplished in any number of ways including removing files which are older than a predefined threshold or, determining if a file is no longer linked to any symbolic link data 15 in the link queue 14 and then deleting a file. Furthermore, such clean up may be accomplished by a method of the send symbolic link object, an autonomous clean up routine or other such methods known to those of skill in the art.

In particular, the File Transfer Cores 16 and 26 may maintain volatile reference counts for all managed files in a storage bin of the File Transfer Core 16 and 18. Upon system invocation the symbolic link data becomes instantiated as file transfer queue entries in the Entry Queue 14 and 24. Upon instantiation, file transfer queue entries register their reference to their respective file copies in the File Transfer Core 16 and 18. Configurable file expiration parameter may be utilized such that unreferenced file copies after expiration of a time period with reference to the last activity of the files.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An object oriented system for transferring files between a first data processing system and a second data processing system, comprising:

a send symbolic link object which controls the transfer of chunks of files from the first data processing system to the second data processing system so as to dynamically modify characteristics of a file transfer during transfer of the file;

a persistent queue which stores data associated with a file transfer request for populating send symbolic link objects;

a file transfer core which stores copies of files to be transferred and which populates a send symbolic link object with data associated with a file transfer request corresponding to a copy of a file stored in the file transfer core; and a connection reader which extracts data associated with a file transfer request from the queue, repopulates a send symbol link object with the extracted data and transfers a chunk of a file associated with a file transfer request specified by the repopulated send symbol link object from the first data processing system to the second data processing system, wherein the file associated with the file transfer request comprises more than one chunk.

2. A system according to claim 1, wherein a repopulated send symbolic link object for a transfer request tracks the transfer of chunks from a file stored in the file transfer core associated with the transfer request, determines an amount of data in a chunk the connection reader transfers to the second data processing system and serializes data to repopulate the send symbolic link object for storing in the queue.

3. A system according to claim 1, wherein the data, associated with a file transfer, to repopulate a send symbolic link object is stored and extracted from the persistent queue based on a fairness policy.

4. A system according to claim 1, wherein the file transfer core copies a file to be transferred to the file transfer core when a request to transfer a file is received by the file transfer core.

5. A system according to claim 4, wherein the file transfer core determines if a file stored in the file transfer core is the same file as the file associated with the file transfer request and stores a copy of the file associated with the file transfer request in the file transfer core if the file associated with the file transfer request is different from the files stored in the file transfer core.

6. A system according to claim 4, wherein a file transfer core controls storage of the file associated with the file transfer request so as to modify file storage characteristics associated with the file when it is stored in the file transfer core.

7. A system according to claim 6, wherein the file transfer core controls the characteristics associated with the file based on an operating environment of the first data processing system.

8. A system according to claim 6, wherein the file transfer core controls the characteristics associated with the file based on a file type associated with the file.

9. A system according to claim 1, further comprising:
   a receive symbolic link object which controls the receipt of files from the first data processing system to the second data processing system;
   a connection writer which receives chunks associated with a file transfer request from the first computer;
   a persistent queue, responsive to the connection writer, which stores data for populating receive symbolic link objects; and
   a file transfer core that populates a receive symbolic link object with data associated with the received chunks and, responsive to the populated receive symbolic link object, stores received data from files to be transferred.

10. A system according to claim 1, wherein the send symbolic link object comprises:
    a method for determining which data from the copy of the file stored in the file transfer core to include in a chunk to transfer to the second data processing system; and
    a method for tracking which data from the copy of the file stored in the file transfer core has been sent to the second data processing system.

11. A system according to claim 1, wherein the characteristics of the file transfer dynamically modified comprises a chunk size of the transfer.

12. A method of transferring files between a first data processing system and a second data processing system, comprising:
    receiving a file transfer request which requests transfer of a file from the first data processing system to the second data processing system, and which provides data for populating instances of a send symbolic link object;
    generating, in response to receipt of a file transfer request, a send symbolic link object populated with data associated with the file transfer request, which controls the transfer of chunks of files from the first data processing system to the second data processing system so as to dynamically modify characteristics of a file transfer during transfer of the file;
    storing a copy of the file associated with the transfer request in a transfer core;
    storing in a persistent queue the data associated with the file transfer request for populating send symbolic link objects;
    extracting from the persistent queue, data associated with the file transfer request to repopulate the send symbolic link object;
    wherein the repopulated send symbolic link object carries out the step of determining a chunk of data from the file associated with the file transfer request to transfer to the second data processing system; and
    transferring the chunk of data from the file associated with the file transfer request determined by the repopulated send symbolic link object from the first data processing system to the second data processing system.

13. A method according to claim 12, wherein the repopulated send symbolic link object for a transfer request further carries out the steps of:
    tracking the transfer of chunks from the file associated with the file transfer request;
    determining an amount of data in a chunk transferred to the second data processing system; and
    serializing data to repopulate the send symbolic link object in the persistent queue, wherein the serialized data reflects the transfer of an amount of data from the file associated with the file transfer request corresponding to the amount of data in the chunk transferred to the second data processing system.

14. A method according to claim 13, further comprising the steps of:
    determining if a file stored in the file transfer core is the same file as the file associated with the file transfer request; and
    storing a copy of the file associated with the file transfer request in the file transfer core if the file associated with the file transfer request is different from the files stored in the file transfer core.

15. A method according to claim 14, further comprises the step of modifying file storage characteristics associated with the file prior to carrying out the step of storing a copy of the file.

16. A method according to claim 15, wherein said step of modifying file storage characteristics comprises the step of modifying the characteristics associated with the file based on an operating environment of the first data processing system.

17. A method according to claim 15, wherein said step of modifying file storage characteristics comprises the step of modifying the characteristics associated with the file based on a file type associated with the file.

18. A method according to claim 12, wherein the data to repopulate the send symbolic link object associated with a file transfer is stored and extracted from the queue based on a fairness policy.

19. A method according to claim 12, further comprising:
    receiving chunks associated with a file transfer request from the first computer;
    responsive to receiving chunks associated with a file transfer request, populating a receive symbolic link object which controls the receipt of files from the first data processing system to the second data processing system;
    storing in a persistent queue data for repopulating receive symbolic link objects when subsequent chunks associated with the file transfer request are received; and wherein a populated receive symbolic link object carries out the step of controlling storage of the received chunk received from the first data processing system.

20. A method according to claim 12, wherein the populated send symbolic link object dynamically modifies a chunk size of the transfer.

21. A computer program product for transferring files between a first data processing system and a second data processing system, comprising:

a computer-readable storage medium having computer-readable program code means embodied in said medium, said computer-readable program code means comprising:

computer-readable program code means for receiving a file transfer request which requests transfer of a file from the first data processing system to the second data processing system, and which provides data for populating instances of a send symbolic link object;

computer-readable program code means for generating, in response to receipt of a file transfer request, a send symbolic link object populated with data associated with the file transfer request, which controls the transfer of chunks of files from the first data processing system to the second data processing system so as to dynamically modify characteristics of a file transfer during transfer of the file;

computer-readable program code means for storing a copy of the file associated with the transfer request in a transfer core;

computer-readable program code means for storing in a persistent queue the data associated with the file transfer request for populating send symbolic link objects;

computer-readable program code means for extracting from the persistent queue, data associated with the file transfer request to repopulate the send symbolic link object;

wherein the repopulated send symbolic link object further comprises computer-readable program code means for determining a chunk of data from the file associated with the file transfer request to transfer to the second data processing system; and computer-readable program code means for transferring the chunk of data from the file associated with the file transfer request determined by the repopulated send symbol link object from the first data processing system to the second data processing system.

22. A computer program product according to claim 21, wherein the repopulated send symbolic link object for a transfer request further comprises:

computer-readable program code means for tracking the transfer of chunks from the file associated with the file transfer request;

computer-readable program code means for determining an amount of data in a chunk transferred to the second data processing system; and computer-readable program code means for serializing data to repopulate the send symbolic link object in the persistent queue, wherein the serialized data reflects the transfer of an amount of data from the file associated with the file transfer request corresponding to the amount of data in the chunk transferred to the second data processing system.

23. A computer program product according to claim 21, wherein the data to repopulate the send symbolic link object associated with a file transfer is stored and extracted from the queue based on a fairness policy.

24. A computer program product according to claim 22, further comprising:

computer-readable program code means for determining if a file stored in the file transfer core is the same file as the file associated with the file transfer request; and computer-readable program code means for storing a copy of the file associated with the file transfer request in the file transfer core if the file associated with the file transfer request is different from the files stored in the file transfer core.

25. A computer program product according to claim 24, further comprising computer-readable program code means for modifying file storage characteristics associated with the file prior to storing a copy of the file.

26. A computer program product according to claim 25, wherein the characteristics associated with the file are modified based on an operating environment of the first data processing system.

27. A computer program product according to claim 25, wherein the characteristics associated with the file are modified based on a file type associated with the file.

28. A computer program product according to claim 21, further comprising:

computer-readable program code means for receiving chunks associated with a file transfer request from the first computer;

responsive to receiving chunks associated with a file transfer request, computer-readable program code means for populating a receive symbolic link object which controls the receipt of files from the first data processing system to the second data processing system;

computer-readable program code means for storing in a persistent queue data for repopulating receive symbolic link objects when subsequent chunks associated with the file transfer request are received; and computer-readable program code means for storing the received chunk received from the first data processing system.

29. A computer program product according to claim 21, wherein the populated send symbolic link object dynamically modifies a chunk size of the transfer.

30. A method of concurrently transferring a plurality of files between a first data processing system and a second data processing system, the method comprising:

multiplexing chunks of the plurality of files onto a connection between the first data processing system and the second data processing system; and dynamically determining a chunk size for each multiplexed chunk.

31. A method according to claim 30, further comprising the step of tracking the transfer of each multiplexed file so as to allow restarting of an interrupted file transfer from a point of interruption of the transfer.

32. A method according to claim 30, wherein said tracking step comprises:

storing, in a persistent queue, tracking information associated with each file transfer; and storing a copy of each of the plurality of files in persistent storage.

33. A method according to claim 30, wherein said step of multiplexing comprises the steps of:

selecting chunks of the plurality of files based on a fairness policy; and multiplexing the selected chunks on the connection between the first data processing system and the second data processing system.

34. A system for concurrently transferring a plurality of files between a first data processing system and a second data processing system, comprising:

means for multiplexing chunks of the plurality of files onto a connection between the first data processing system and the second data processing system; and means for dynamically determining a chunk size for each multiplexed chunk.

35. A system according to claim 34, further comprising means for tracking the transfer of each multiplexed file so as to allow restarting of an interrupted file transfer from a point of interruption of the transfer.

36. A system according to claim 34, wherein said means for tracking comprises:

means for storing in a persistent queue, tracking information associated with each file transfer; and means for storing a copy of each of the plurality of files in persistent storage.

37. A system according to claim 34, wherein said means for multiplexing comprises:

means for selecting chunks of the plurality of files based on a fairness policy; and means for multiplexing the selected chunks on the connection between the first data processing system and the second data processing system.

38. A computer program product for concurrently transferring a plurality of files between a first data processing system and a second data processing system, comprising:

a computer-readable storage medium having computer-readable program code means embodied in said medium, said computer-readable program code means comprising:

computer-readable program code means for multiplexing chunks of the plurality of files onto a connection between the first data processing system and the second data processing system; and computer-readable program code means for dynamically determining a chunk size for each multiplexed chunk.

39. A computer program product according to claim 38, further comprising computer-readable program code means for tracking the transfer of each multiplexed file so as to allow restarting of an interrupted file transfer from a point of interruption of the transfer.

40. A computer program product according to claim 38, wherein said computer-readable program code means for tracking comprises:

computer-readable program code means for storing in a persistent queue, tracking information associated with each file transfer; and computer-readable program code means for storing a copy of each of the plurality of files in persistent storage.

41. A computer program product according to claim 38, wherein said computer-readable program code means for multiplexing comprises:

computer-readable program code means for selecting chunks of the plurality of files based on a fairness policy; and computer-readable program code means for multiplexing the selected chunks on the connection between the first data processing system and the second data processing system.

\* \* \* \* \*